UNITED STATES PATENT OFFICE.

JONAS W. AYLSWORTH, OF EAST ORANGE, NEW JERSEY, ASSIGNOR TO HALOGEN PRODUCTS COMPANY, OF WEST ORANGE, NEW JERSEY, A CORPORATION OF NEW JERSEY.

RUBBER COMPOSITION AND ITS PRODUCTION.

1,098,609.   Specification of Letters Patent.   Patented June 2, 1914.

No Drawing.   Application filed April 18, 1912.   Serial No. 691,728.

*To all whom it may concern:*

Be it known that I, JONAS W. AYLSWORTH, a citizen of the United States, and a resident of East Orange, in the county of Essex and State of New Jersey, have invented certain new and useful Improvements in Rubber Compositions and Their Production, of which the following is a description.

My invention relates to new and improved rubber compositions and processes of making the same.

My invention is based on my discovery that the chlorin or other equivalent substitution products of naphthalene or their oxidized products or derivatives facilitate the mixing and union of sulfur and rubber in vulcanization and remain in the vulcanized rubber in the form of a solidified solution and contribute thereto certain unique and valuable properties. The various products formed vary over a wide range in their properties, depending upon the ingredients used, that is, upon the percentage and kind of chloro-naphthalene, the quality and percentage of rubber, the percentage of sulfur, and also, when a filling material is used, upon its amount and character. These compositions are especially adapted for such purposes as the electrical insulation of wires and cables, the electrical insulation and protection of metal containers for batteries, for baking japan or lacquer, for chemically resistant coatings for metals, and for forming various articles and products in which rubber compositions are used, as for example, in golf balls. On account of the strong adhesion of these compounds, they form good cementing materials for cementing together metal and other articles. The chloro-naphthalene constituents render the products non-inflammable or difficultly so, depending upon the ingredients composing the composition. Hard rubber compositions can be made in accordance with my invention which are much less brittle than the corresponding compositions made without chloro-naphthalene constituents, and which are of great toughness and strength and possess considerable flexibility. These compositions do not tend to become brittle when exposed to low temperatures, as is the case with forms of hard rubber known prior to my invention. The ingredients may be so proportioned that a hard leathery sheet is obtained which is extremely strong, tough and durable, and is capable of standing high temperatures much more readily than the ordinary known forms of hard rubber. This property adapts the material for packing purposes, gaskets, and the like, such as are used for steam or water pipes, and particularly for pipes which carry active chemicals, such as chlorin gas and the like. The improved qualities of these compositions are due in part to the fact that the chloro-naphthalenes dissolve sulfur perfectly in all proportions when heated therewith, and also to the fact that the chloro-naphthalenes dissolve rubber in like manner, which greatly facilitates the union of the rubber and sulfur. Some of the chloro-naphthalenes are tough wax-like substances, and these have high melting points and are very resistant to chemical agents. They are all insoluble in water and unaffected by alkaline or acid solutions, excepting very concentrated hot oxidizing acids, such as nitric, sulfuric and chromic. With the exception of mono-chloro-naphthalene and mono-bromo-naphthalene, which are oily liquids that do not solidify except at very low temperatures, the halogen naphthalenes are solids, some soft and wax-like, others tough and flexible, others hard and wax-like, and still others hard like a fused mineral salt. All of these substances have small coefficients of expansion by heat as compared with ordinary vulcanized rubber and they contribute this property to my improved rubber compositions, which makes it possible to employ these compositions for coatings on metal which adhere and remain in place through considerable temperature changes. Examples of compositions made in accordance with my invention are as follows:—

Soft elastic compositions.

No. 1. 100 parts of rubber, 6 to 18 parts of sulfur, 10 to 30 parts of mono-chloro-naphthalene, 0 to 100 parts of filling material, preferably non-fibrous.

No. 2. 100 parts of rubber, 6 to 19 parts of sulfur, 10 to 100 parts of solid chloro-naphthalene, preferably the tri-, tetra-, or hexa-chloro-naphthalenes or mixtures of the same.

Semi-hard compositions.

No. 3. 100 parts of rubber, 40 to 80 parts of sulfur, 25 to 200 parts of solid chloro-naphthalene, preferably tetra-, penta-, hexa-, or hepta-chloro-naphthalenes or mixtures of the same, that is, those naphthalenes in which the chlorin has reached the stage from the tetra or upward to the octa, 0 to 250 parts of filling material, preferably fibrous.

These materials may be compounded in the usual way by mastication on rubber mixing rolls, the chloro-naphthalene constituents being either finely comminuted or added in the melted state, and the resulting mixture or compound then vulcanized in the usual manner. It is preferable, however, to mix the chloro-naphthalene constitutents before adding the sulfur, as sometimes the high heat necessary in mixing some forms of chloro-naphthalene will cause a premature vulcanization to take place upon the mixing rolls if the sulfur is mixed first. Furthermore, it is advisable to allow the mixture to cool somewhat before adding the sulfur. The chloro-naphthalene constituents appear to cause more rapid vulcanization than is the case with the same grades of rubber in which these constituents are not used. The qualities of all of these compositions, as well as of those described hereinafter, depend somewhat upon the nature of the rubber, as is the case in all rubber compositions. Where filling materials are employed, they may be added to the mixture at any convenient stage of the process prior to vulcanization, but preferably these materials are added after the sulfur. The mixture of ingredients should be thoroughly masticated before vulcanization.

Wherever rubber is mentioned herein I mean either the pure rubber, or the average mixtures of rubber used in the arts, such as mixtures of Pará, African and Guayule rubber.

The following is an example of a composition made in accordance with my invention and suitable for baking japan and lacquer for coating metals:—

No. 4. 50 parts of Pará rubber, 50 parts of Guayule rubber, 60 parts of sulfur, 25 to 200 parts solid chloro-naphthalene, 100 to 500 parts liquid mono-chloro-naphthalene.

In making this composition, the rubber and solid chloro-naphthalene constituents are first mixed on rolls and then the sulfur is added, and the mixed compound is shredded and heated with the liquid mono-chloro-naphthalene in which it dissolves, forming a varnish-like liquid which thickens considerably on cooling. After complete solution has taken place, the solution may be used, preferably hot, as a dip for coating objects, and it may also be applied with a brush or with an air brush, or in any other suitable manner. Suitable pigments or filling substances may be used in this composition. After the articles are coated they are baked at a temperature varying from 250° to 300° F. During the baking operation most of the mono-chloro-naphthalene is driven off, leaving a tough flexible film of an improved rubber composition which adheres most tenaciously to objects, including metals. Compositions made according to example No. 4 are particularly adapted for coating wires and cables to insulate the same, for coating other metal articles, such as metal battery containers, and for japanning or laquering articles. It is especially adapted for forming an insulating and protective coating for the steel or nickel-plated steel storage battery containers of the alkaline type, and in fact for coating metal articles of any kind where an insulating chemically resistant coating or both is desired.

The following is another example of a composition made in accordance with my invention. This composition is adapted to be melted by heating it and poured, as for example, into molds prior to vulcanizing, or to be used for dipping and coating, or impregnating articles or materials.

No. 5. 100 parts of rubber, 10 to 100 parts of sulfur, 150 to 550 parts of solid chloro-naphthalene, preferably the tetra-, penta-, or hexa-chloro-naphthalenes or mixtures of the same, 0 to 250 parts of fillers.

The percentage of sulfur may be varied between the limits indicated, the lower proportions producing soft and elastic compositions and the higher proportions producing harder compositions. Compositions containing these ingredients are especially adapted for making insulators, for insulating wires and coils, for impregnating wood or other fiber to render the same moisture- and fire-proof and chemically resistant. An example of a particular use for this composition is the making of form wound coils for generators, motors and other electrical machines. Form wound coils coated and impregnated with this composition withstand the pounding to which such coils are subjected when they are driven into place in the machine. In making compositions according to example No. 5, the ingredients are mixed together and melted by heat, then poured into molds or around the articles which are to be coated, and afterward vulcanized. Where impregnation is desired, any suitable method of impregnating the article or material with the molten composition may be employed, as for example, the well known vacuum and pressure method. The article or material is afterward subjected to a vulcanizing heat.

The following is an example of another baking japan or lacquer made in accordance with my invention:

No. 6. Ingredients of the kinds and proportions given in examples Nos. 1, 2 or 3 are dissolved either separately or after mixing in a volatile solvent which is of such a nature as to cause the rubber, sulfur and chloro-naphthalene to go into solution. An example of such a solvent is acetylene-tetrachlorid. The solution may be made in very concentrated form when heat is employed to assist in liquefaction. The solution may be applied to the articles to be coated in any suitable way, as for example, by dipping. The coated article is permitted to dry, and is then subjected to a vulcanizing heat, or the drying and vulcanization may be accomplished as a continuous operation by suitably regulating the heat applied.

In my improved rubber compositions, the chloro-naphthalene constituents employed may be crude or pure products and the distillation residues from crude chloro-naphthalenes may also be used. Other halogen substitution products of naphthalene, such as the bromo-naphthalenes, may be used instead of the chloro-naphthalenes, but are more expensive. Instead of the halogen naphthalene, the oxidized products or derivatives of halogenated naphthalenes, such as are described in my prior application Serial No. 641,326, filed July 29, 1911, may be employed in making my improved rubber compositions in substantially the same proportions as set forth above.

Other vulcanizing agents than sulfur may be used, such as pentasulfid of antimony. The compositions made in accordance with examples 1, 2, 4 and 5 are particularly advantageous for the electrical insulation of wires and cables. Compositions made in accordance with examples 4 and 5 are particularly advantageous for the electrical insulation of containers for alkaline batteries, and composition No. 3 is particularly adapted for making chemically resistant coatings for metals and for forming golf balls and other products in which rubber compositions are used. A composition having the characteristics of the hard leathery sheet hereinbefore described may be made in accordance with example No. 3.

It will be understood that the phrases "halogen derivative" and "chlorin derivative" of naphthalene, in the claims, are intended to include the oxidized products or derivatives of the chlorin or other halogen substitution products of naphthalene, which perform the functions and contribute the properties described, as well as such substitution products themselves. Also that the phrases "solution" and "dissolved together" include a solidified solution.

Having now described my invention, what I claim as new therein and desire to protect by Letters Patent is as follows:—

1. A composition of matter having combined therein rubber, a halogen derivative of naphthalene, and a vulcanizing agent, substantially as set forth.

2. A composition of matter having combined therein rubber, a chlorin derivative of naphthalene, and a vulcanizing agent, substantially as set forth.

3. A composition of matter comprising a solution of vulcanized rubber and a halogen derivative of naphthalene, substantially as described.

4. A composition of matter having combined therein rubber, sulfur, and a halogen substitution product of naphthalene, all dissolved together, substantially as described.

5. A composition of matter having combined therein rubber, a halogen derivative of naphthalene, and sulfur, substantially as set forth.

6. A composition of matter having combined therein rubber, a chlorin derivative of naphthalene, and sulfur, substantially as set forth.

7. A composition of matter having combined therein rubber, a halogen derivative of naphthalene, a vulcanizing agent, and filling material, substantially as set forth.

8. A composition of matter having combined therein rubber, a chlorin derivative of naphthalene, a vulcanizing agent, and filling material, substantially as set forth.

9. A composition of matter having combined therein rubber, a halogen derivative of naphthalene, sulfur, and filling material, substantially as set forth.

10. A composition of matter having combined therein rubber, a chlorin derivative of naphthalene, sulfur, and filling material, substantially as set forth.

11. A composition of matter having combined therein a vulcanizable gum, a vulcanizing agent, and a halogen derivative of naphthalene, all dissolved together, substantially as described.

12. A vulcanized rubber composition having combined therein a halogen derivative of naphthalene, substantially as set forth.

13. A vulcanized rubber composition having combined therein a chlorin derivative of naphthalene, substantially as set forth.

14. A vulcanized rubber composition having combined therein solid and liquid halogen derivatives of naphthalene, substantially as described.

15. The process of making a rubber composition, which consists in masticating a mixture of rubber, a halogen derivative of naphthalene, and a vulcanizing agent and heating the resulting mixture to vulcanize the same, substantially as described.

16. The process of making a rubber composition, which consists in masticating rubber and a halogen derivative of naphthalene, masticating a vulcanizing agent therewith, and heating the resulting mixture to vulcanize the same, substantially as described.

17. The process of making a rubber composition which consists in masticating, dissolving together, and vulcanizing a halogen derivative of naphthalene, a vulcanizable gum which is soluble in the said naphthalene derivative when heated therewith, and a vulcanizing agent, substantially as described.

18. The process of making a rubber composition, which consists in making a masticated mixture of rubber, a halogen derivative of naphthalene, a vulcanizing agent, and filling material, said ingredients being added in the order named, and heating the resulting mixture to vulcanize the same, substantially as described.

19. The method of making a rubber composition, which consists in masticating rubber and solid chloro-naphthalene, masticating sulfur therewith, and heating the resulting mixture with a liquid chloro-naphthalene to dissolve the same, substantially as described.

20. The process of making a rubber composition, which consists in masticating rubber and a solid halogen derivative of naphthalene, masticating sulfur therewith, and heating the resulting mixture with a liquid halogen derivative of naphthalene to dissolve the same, substantially as described.

This specification signed and witnessed this 8th day of April, 1912.

JONAS W. AYLSWORTH.

Witnesses:
HENRY LANAHAN,
ANNA R. KLEHM.